July 31, 1934.    P. H. D. WINSOR ET AL    1,968,729
ROTARY MOTOR
Filed Nov. 5, 1932    5 Sheets-Sheet 1

Fig.1.

Inventors
P.H.D. Winsor
C.N. Adams
By Geo. P. Kimmel
Attorney

Patented July 31, 1934

1,968,729

UNITED STATES PATENT OFFICE 1,968,729

ROTARY MOTOR

Philip H. D. Winsor, Lodi, and Christopher Norman Adams, Galt, Calif., assignors of nineteen per cent to Charles A. Rinde, Lodi, Calif.

Application November 5, 1932, Serial No. 641,434

11 Claims. (Cl. 60—44)

This invention relates to a rotary motor of the external combustion type and has for its object to provide, in a manner as hereinafter set forth, a motor of the class referred to for generating comparatively great power in a small space and with minimum weight.

A further object of the invention is to provide, in a manner as hereinafter set forth, a motor of the class referred to whereby all power is delivered to the rotor at the extremity of and always at right angles to the lever arm thereby greatly increasing the efficiency of the motor over that of the conventional type.

A further object of the invention is to provide, in a manner as hereinafter set forth, a motor of the class referred to for increasing the number of power strokes per revolution for a given number of pressure generating and directing devices whereby the flexibility of a motor, in accordance with this invention is exceedingly great.

Further objects of the invention are to provide, in a manner as hereinafter set forth, a motor of the class referred to which is simple in its construction and arrangement, strong, durable, compact, thoroughly efficient in its use, readily assembled, capable of generating great power, and comparatively inexpensive to set up.

To the above ends essentially, and to others which may hereinafter appear, the invention consists of such parts and such combination of parts which fall within the scope of the invention as claimed.

The motor includes a rotor 1 comprising, a hub 2, a series of radially disposed spokes 3 and a rim 4. The latter is formed with spaced channel shaped parts 5 separated by transverse grooves 6. Each part 5 is arranged between a pair of spokes 3 and includes an inset inner wall formed of a forwardly extending curved leading portion 8, an arcuate intermediate portion 9 and a follower portion 10. The outer face of portion 8 inclines outwardly and forwardly with respect to the leading end of portion 9 and terminates at the outer edge of the rim. The outer face of portion 10 is upon a slight concave curve. The rear end of the outer face of portion 10 is sufficiently below the outer edge of the rim. The portion 10 extends inwardly and forwardly at an inclination and has the inner end of its outer face merging in the follower end of the outer face of portion 9. The side walls of each channel shaped part 5 are indicated at 5'. The side walls 11 of each groove 6 are shouldered as at 12. Arranged within each groove 6 are a pair of endwise opposed bow-shaped sustaining springs 13 carrying a shiftable sealing plate 14 of arcuate form arranged outwardly with respect to shoulders 12 and adapted to be extended from the rim 4 for a purpose to be referred to. The outer ends of spokes 3 are integral with rim 4. The grooves 6 are arranged in the rim portions that are integral with the spokes. The hub 2 is splined to a power transmitting shaft 15 whereby the latter will be carried with the rotor.

The rotor housing including a pair of oppositely disposed stationary annular head pieces 16, 17 and each is formed with an axial opening 18 and an outwardly directed collar 19, spaced from the wall of opening 18, to provide a shoulder 20, against which abuts an annulus 21 having a beveled inner face 21' seated against conoidal shaped bearing rollers 22 mounted on a frusto-conical bearing sleeve 23 carried by shaft 15. The outer portion of the inner face of collar 18 is threaded and engaging therewith is a threaded retaining ring 24 which abuts the outer ends of rollers 22. The sleeves 23 abut the hub 2.

The rotor housing also includes an outer part in the form of an annular stationary casing 25 of channel shaped cross section which extends between, projects from and is detachably secured to the outer marginal portions of the inner faces of and supported from the head pieces 16, 17 by the holdfast devices 26. The casing 25 opens inwardly and includes an outer wall 27 and a pair of side walls 28. The wall 27 is formed with two sets of apertures, one set for the extension therethrough of the pressure generating devices, and the other for the extension therethrough of the combined intake and exhaust controlling units. The openings of one set are indicated at 29 and those of the other set at 30. The openings 29 are alternately arranged with respect to the openings 30. The number of openings 29 correspond to the number of power generating devices used. The number of openings 30 correspond to the number of combined intake and exhaust units used. By way of example, the motor is set up with two sets of three openings, three pressure generating devices and three combined intake and exhaust controlling units, but it is to be understood that the number can be diminished or increased. The end walls of each opening 29 are oppositely beveled. The end walls of each opening 30 are oppositely beveled. The outer wall 27 is formed on its outer face with spaced pairs of lugs having the outer faces thereof oppositely beveled and the lugs of each of said pairs are indicated at 31, 32. The outer wall 27 is also formed with spaced pairs of lugs having the outer faces thereof oppositely beveled and the lugs of each of said pairs are indicated at 33, 34. The opposed ends of the lugs 31, 32 of each pair are oppositely beveled. The opposed ends of the lugs 33, 34 of each pair are oppositely beveled. The lugs 31, 32 are of greater height than lugs 33, 34. The opposed ends of the lugs 31, 32 of each pair form continuations of the end walls of an opening 29. The opposed ends of the lugs 33, 34 of each pair form continuations of the end walls of an opening 30. The lugs 31 are arranged in close proximity to lugs 33 and the lugs 32 in close proximity to lugs 34. The side walls 28 of support 25 have spaced laterally extending ledges 35.

Extending through each opening 29, to the rim 4, is a pressure generating device 36 comprising a stationary housing 37 open at its inner end and substantially semi-circular in cross section. The sides 38 of housing 37 are apertured as at 39 and formed with lateral tubular extensions 40 registering with the apertures 39 and seating on a pair of horizontally aligning ledges 35. The housing is arranged against the side walls of the opening 29 and has inclined outer face portions bearing against the end walls of the opening and a pair of lugs 31, 32. The housing is also formed with oppositely extending inclined flanges 41, 42 seating upon the beveled faces of lugs 31, 32 respectively. Holdfast devices 43 are employed for fixedly securing the flanges to lugs 31, 32 to maintain housing 37 stationary.

Arranged within housing 37 is a normally shifted valved controlled combined pressure generating and pressure-directing element or device 43' of the external combustion type comprising a body part 44 formed with a combustion chamber 45, a pressure outlet 46, a valve seat 47, a spring controlled normally seating valve 48, an intake 49 for the combustible charge to chamber 45, a part of the wall of intake 49 being beveled to provide the seat 47 for valve 48, a guide 51 for the stem 52 of the valve 48, a resilient sealing means 53 between body part 44 and inner face of housing 37, a channeled shaft 54 fixed to body part 44 and journaled in the extensions 40, cooling water circulating channels 55 communicating with the channels 56 in the shaft 54 and an outer beveled surface 57. Cooling water supply and return means are indicated at 56', 56'' and which are suitably coupled to the ends of shaft 54 for communication with the channels 56.

Arranged within the inner portion of housing 37, as well as being integral therewith, is a web providing a rearwardly inclined abutment 58 for limiting the shifting movement of element 43', when it is moved from extended or power directing position back to normal position within housing 37. The element 43' when in normal position is spaced from the back of housing 37 and provides in connection with the latter and the abutment 58 a fuel intake chamber 59 having its discharge controlled by valve 48, the latter also constitutes means for closing chamber 45 to chamber 59 when the charge is burned in the former.

The element 43' travels against a portion of the inner face of each side wall, a portion of the inner face of the outer wall, the inner face of the front of the housing and the forward face of the abutment when being shifted to pressure directing position. The element 43' may be shifted by any suitable means and the latter is shown by way of example as a spring to be presently referred to. The element 43' after being shifted to pressure directing position is returned to a position within the housing by the rotor.

The outlet 46 not only provides for directing the power caused by the combusting of the charge, but also permits the action of a spark from a spark plug 60 to ignite the charge in chamber 45. The plug 60 is secured to the front of housing 37 and aligns, when element 43' is in normal position, with the outlet 46. Valve stem 52 has surrounding it a coiled controlling spring 60' which is interposed between a stop 61 on the outer end of stem 52 and the guide 51.

The element 43' includes a controlling spring 62 acting to normally project it from the housing 37 into a channeled shaped part 5 of the rim 4. The element 43' is rotated in one direction on its axis by the spring 62. The shifting of element 43' by the rotor to a position within housing 37 is had against the action of spring 62. The element 43' is rotated in the other direction on its axis by the rotor. The shaft 54 carries a crank arm 63 at one end, and such arm has one end of spring 62 attached thereto. The other end of the spring is anchored to a post 64 which is secured to head piece 16. The body part 44 carries resilient sealing means 53 against which rides the inner faces of the sides of the channel shaped parts 5 of rim 4.

Secured to wall 27 in a manner to extend into an opening 30 is a combined intake and exhaust controlling unit or mechanism 65 comprising a rectangular plate 66 of arcuate contour formed with spaced, parallel, transversely extending rectangular slots 67, 68, the former constituting an intake port for a combustible charge and the latter an outlet port for the products of combustion after a charge has been combusted. The plate 66 is secured at its follower end by the holdfast means 69 to a lug 34. The rear wall of slot 68 forms a continuation of the leading end of lug 34. Between the slots 67, 68, as well as being spaced therefrom, the plate 66 is outset to form a casing 70 of semi-circular cross section which is open at its inner end and has its sides formed with lateral tubular extensions 71. Extending through the housing 70 and extensions 71 is a rotatable shaft 72 which has fixed thereto, within housing 70, one end of a controlling member 73 which functions to separate the incoming charge from the products of combustion of a combusted charge. The member 73 is for extension into channeled shaped parts 5 of the rim 4 of rotor 1. The parts of the plate 66 which project forwardly and rearwardly with respect to that portion of the plate providing the casing 70 are termed leading and follower extensions 67', 68' respectively having the intake and outlets 67, 68 respectively arranged therein. The leading extension 67' has its inner face formed lengthwise thereof with a recess 69' into which opens the intake 67. The recess 69' is of less length than extension 67' and is adapted to completely house that portion of member 73 when the latter is shifted from a rim chamber. The inner wall of recess 69' constitutes a stop for the outward movement of the portion referred to of member 73. The sides of member 73 are formed with pockets 73' having the walls thereof rabbeted, as at 73''. Seated in the rabbets 73'', are sealing members 74 in the form of laterally shiftable plates controlled by resilient elements 74' of arcuated form which are mounted in the pockets 73' and interposed between the bases of the latter and the inner faces of the members 74. The latter travel against the inner faces of the side walls of the channeled shaped parts 5. Fixed to one end of shaft 72 is a crank arm 75 having one end of a controlling spring 76 attached thereto. The other end of the spring 76 is anchored to a lateral post 77 secured to head piece 16. The function of spring 76 is to project member 73 into the channeled shaped parts 5 of the rims in advance of exhaust port 68 and rearwardly of intake port 67.

The plate 66 at its leading end is secured to a lug 33 by holdfast means 78 and is formed with an inwardly extending beveled portion 79 which abuts the leading end wall of opening 30 and the follower end of the lug.

Each channeled part 5 provides a pressure receiving chamber 80. Sealing means 80' are interposed between rim 4 and casing 25. Sealing elements 14' are interposed between casing 25 and the rim of rotor 1.

Figure 2:
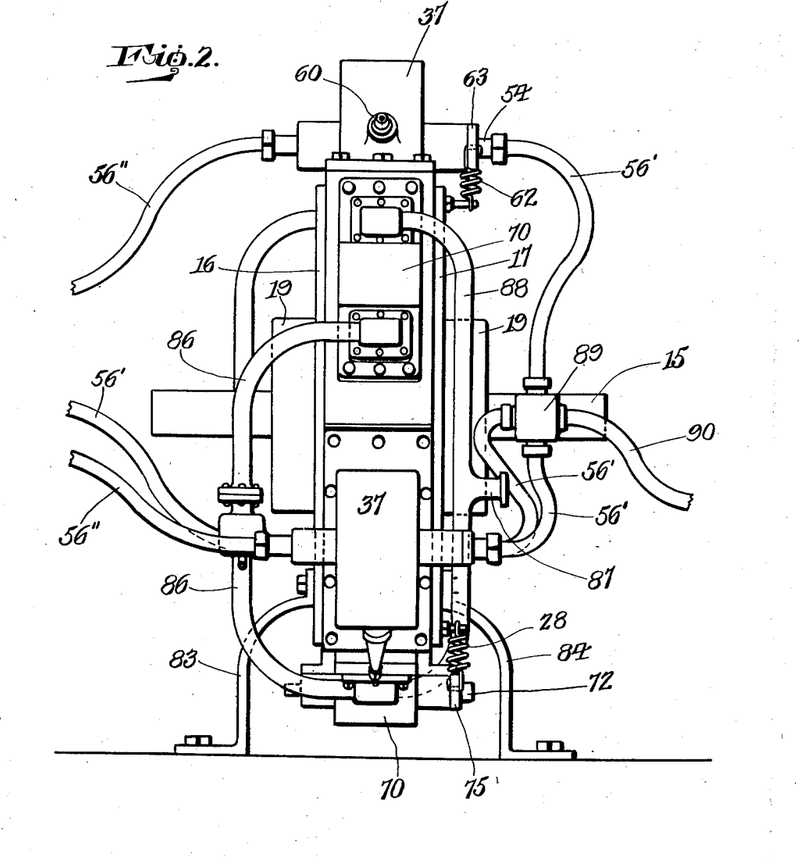
Figure 2 is an elevation looking towards one side of the motor.
Figure 3:
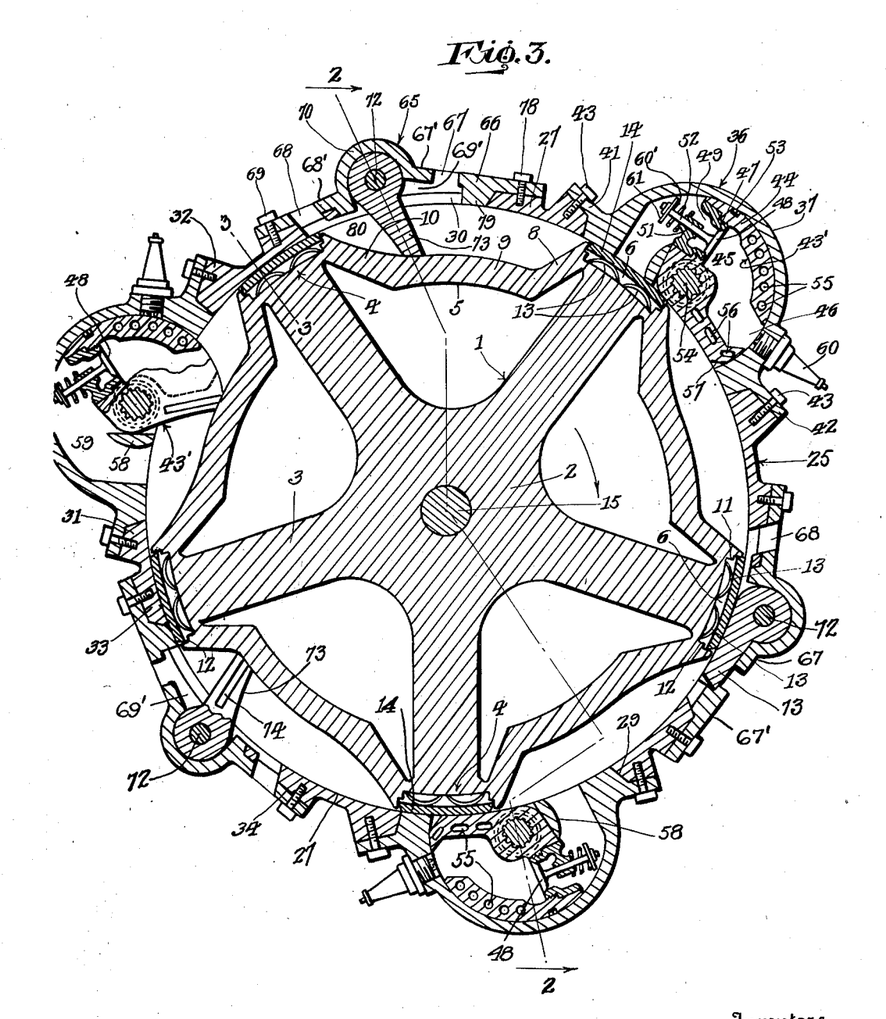
Figure 3 is a vertical sectional view of a rotary motor in accordance with this invention.
Figures 4, 5, 6:
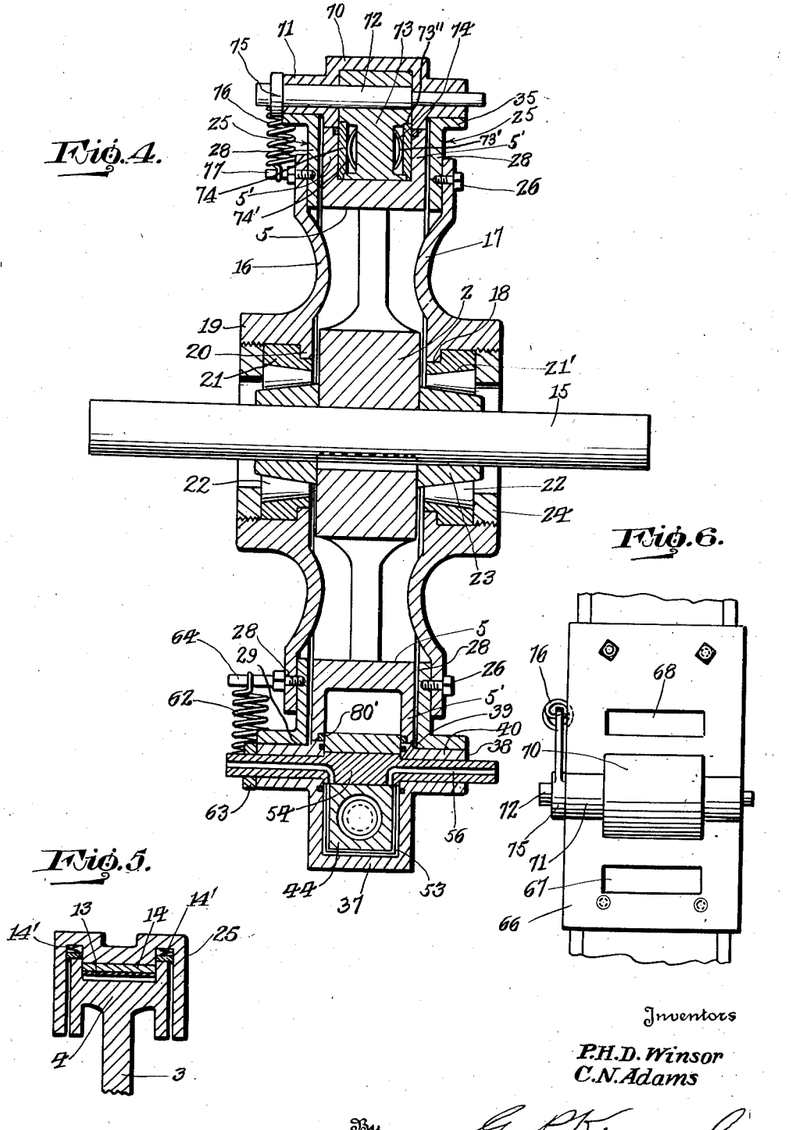
Figure 4 is a section on line 2—2 Figure 3.
Figure 5 is a sectional detail on line 3—3 Figure 3.
Figure 6 is a fragmentary detail view in top plan.

The head pieces 16, 17 are anchored to a pair of stationary upstanding spaced oppositely disposed supports 83, 84 respectively, and said supports function to suspend the rotor housing, as shown in Figure 2. A carburetor 85 is supported from head piece 16 and leading from the carburetor to each intake port 67 is a branch combustible charge supply line 86. A common exhaust 87 is provided for a branched discharge line 88 which leads from each of the exhaust ports 68. The cooling water supply means 56' leads from a pump 89 to one end of each shaft 54. A water inlet 90 is provided for pump 89 and which extends from a suitable source of water supply, not shown. The cooling water return means 56'' leads from the other end of each shaft 54 to the water supply not shown.

Figures 7, 8, 9, 10:
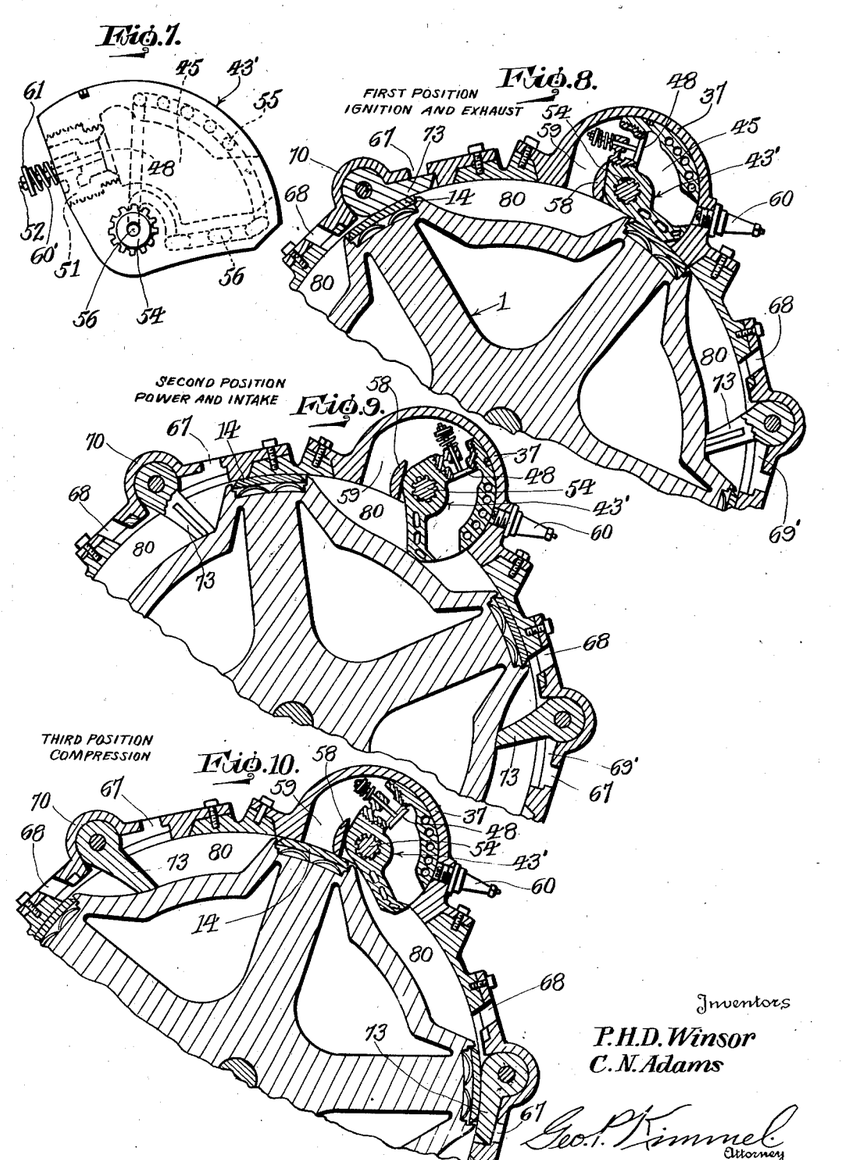
Figure 7 is an elevation of the form of pressure directing element showing the cooling water channels therefor.
Figure 8 is a fragmentary view of the motor in vertical section illustrating the first position of a pressure generating device.
Figure 9 is a fragmentary view of the motor in vertical section illustrating the second position of a pressure generating device.
Figure 10 is a fragmentary view of the motor in vertical section illustrating the third position of a power generating device.

Each pressure generating device has three cycles or three positions during the operation thereof and with reference to Figure 8 the first cycle or position of the device is shown and which is for ignition of a follower combustible charge and exhaust of the products of combustion from a leading combusted charge. A follower rim chamber 80 is filled with a combustible charge ready to be subsequently compressed in chamber 59 by the rotor, as soon as element 43' drops from its position shown in Figure 8. The precompressed charge in chamber 45 is ignited when the device is in the position shown in Figure 8. The products of combustion from the combusted leading charge are scavenged from that rim chamber 80 leading the rim chamber 80 referred to by the member 73 as element 43' is brought to the position shown in Figure 8. Now with reference to Figure 9 the second cycle or position of the device is shown and which is power and intake. The combustible charge within the follower rim chamber 80 referred to and which is supplied thereto by the intake immediately preceding the device when the latter is, as shown in Figure 8, forced into and compressed in chamber 59 by element 43' when it drops into the follower rim chamber 80 referred to. When element 43' drops into the rim chamber just mentioned the products of combustion from the combusted charge will expand in such rim leading chamber and force the rotor to revolve. The valve 48 is held against its seat by the pressure of the expanding products of combustion in chamber 45. With respect to the second position of the device the element 43' thereof will be as shown in Figure 9. Now with reference to Figure 10 the third cycle or position of the device is shown and which is compression of the combustible charge. The combustible charge is compressed from chamber 59 into chamber 45 and with the valve 48 off its seat. The element 43' is raised by the cam action of the rotor, thus forcing the charge from chamber 59 into chamber 45. The charge is retained in chamber 59 by the plate 14 between the two chambers 80 referred to. The charge in 59 has been partially compressed by decrease in volume between the follower chamber 80 and the chamber 59. The charge is further compressed in chamber 45 by decrease in volume thereof in chamber 59 when element 43' is raised. Figure 10 shows the position of element 43' immediately preceding the end of the compression cycle or position of the device with respect to chambers 45 and 59. The final position of element 43' at the end of the compression cycle or position with respect to and the closing of chamber 45 is as shown in Figure 8. Immediately preceding and at the end of the compression cycle or position of the device chamber 59 is closed by the plate 14 between the two chambers 80 referred to.

Figure 1:
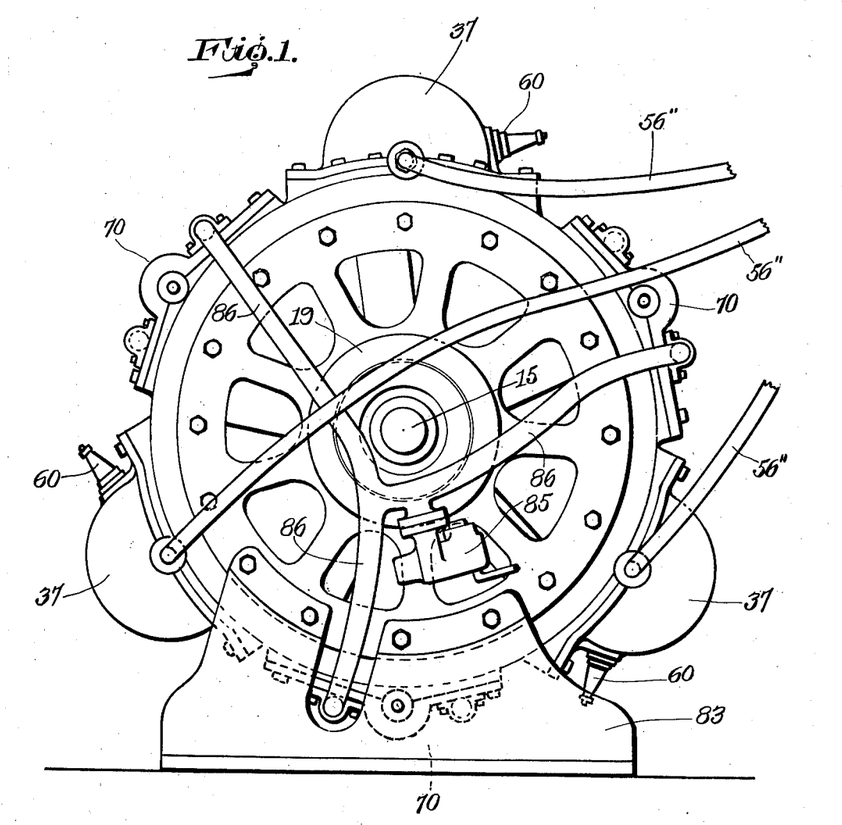
Figure 1 is an elevation of a rotary motor, in accordance with this invention looking towards one end thereof.

With reference to the form of power generating device 36 shown in Figures 1 and 2, fresh gas is supplied to a chamber 80, when the latter comes beneath device 36 through port 67 and at which time the element 43' is pulled down into the chamber 80. The gas is then forced into compression chamber 59 where it is slightly compressed. Valve 48 is held closed by spring 60 and by force of the explosion from a charge combusted in chamber 45. As a chamber 80 passes from completely under device 36, the rotor will turn element 43' back to close chamber 45 and the rotor will act to compress the gas in chamber 59, unseating valve 48 and forcing the gas through passage 49 into chamber 45. A few turns of the rotor may be necessary to build up enough compression in chamber 59 to force the gas into chamber 45. The charge of fresh gas will be ignited by spark plug 60 just as element 43' is to drop into a follower chamber 80. The expanding gas will pass through port, opening or passage 46 into a part of said follower chamber on the explosion side of said device and expend its energy in rotating the rotor.

The element 43' of each pressure generating device 36 will separate an incoming combustible charge from the products of combustion of a combusted charge successively in the rim chambers. The members 73 of each combined intake and exhaust mechanism will provide for scavenging the products of combustion successively from the rim chambers through ports 68. Each member 73 is lifted by the cam action of the rotor for successively closing the intake ports 67 at spaced intervals for a short period and separates when lowered in a rim chamber an incoming charge from the product of combustion of a combusted charge within a chamber 80.

What we claim is:—

1. In a rotary motor of that type including a rotor having spaced chambers opening at its outer edge, spaced stationary housings, spaced stationary casings alternately disposed with respect to the housings, said housings and casings surrounding said edge and opening at their bases into said chambers, a tubular element completely in and pivotally supported at one end within each housing providing a combustion chamber having an open end intermittently closed by one end of the housing and formed with a normally closed valve controlled intake within the housing for the other end of the combustion chamber, an abutment at the base of each housing for the pivoted end of said element and coacting with the latter and housing to provide a compression chamber opening into said intake, means normally tending to project said elements through the base of the housings successively into said rotor chambers to provide for the pressure of combusted charges acting to drive the rotor and for positioning said elements to force incoming charges into the compression chambers and separating combusted charges from incoming charges, said casings being formed with end extensions provided with combustible charge supply and exhaust ports for communication with the rotor chambers, a controlling member pivoted at one end within each casing between the ports in the latter, means tending to normally project said members successively through the base of the casings into said rotor chambers for positioning said members to separate in the rotor chambers combustible charges from combusted charges and for scavenging out the combusted charges, one wall of the rotor chambers being inclined in a direction for moving said elements completely into the housings to close said combustion chambers and for moving said members completely into the extensions at one end of the casings to close said supply ports, said edge having spaced portions acting to temporarily maintain said elements and members completely within the housings and casings and for compressing combustible charges in the compression chambers, and spark plugs carried by the housings at said ends of the latter.

2. In a rotary motor of that type including a rotor, stationary pressure generating devices of the external combustion type circumferentially surrounding and for applying the pressure of combusted charges to the rotor for driving the latter, each of said devices including a housing open at its base, a shiftable tubular element for extension through the base of the housing into the outer edge of the rotor and intermittently shifted outwardly therefrom by the rotor, said element being pivoted at one end within the housing disposed lengthwise of and of less length than the latter and providing a combustion chamber having a normally open end completely closed intermittently by one end of the housing when said element is shifted outwardly from and by the rotor, said element carrying means at its pivoted end providing a normally closed valve controlled intake within the housing for said chamber, an abutment at the base of the housing for the pivoted end of said element and forming in connection with the latter and the housing a compression chamber opening into said intake, means normally tending to shift said element through the base of the housing into the rotor to open the combustion chamber to provide for the pressure of a combusted charge acting on the rotor and for positioning said element in the rotor to force a combustible charge into a compression chamber and for separating a combustible charge from a combusted charge, and a spark plug carried by said end of the housing.

3. In a rotary motor of that type including a rotor having spaced chambers opening at its outer edge, spaced stationary housings, spaced stationary casings alternately disposed with respect to the housings, said housings and casings surrounding said edge and opening at their bases into said chambers, a tubular element completely in and pivotally supported at one end within each housing providing a combustion chamber having an open end intermittently closed by one end of the housing and formed with a normally closed valve controlled intake within the housing for the other end of the combustion chamber, an abutment at the base of each housing for the pivoted end of said element and coacting with the latter and housing to provide a compression chamber opening into said intake, means normally tending to project said elements through the base of the housings successively into said rotor chambers to provide for the pressure of combusted charges acting to drive the rotor and for positioning said elements to force incoming charges into the compression chambers and separating combusted charges from incoming charges, said casings being formed with end extensions provided with combustible charge supply and exhaust ports for communication with the rotor chambers, a controlling member pivoted at one end within each casing between the ports in the latter, means tending to normally project said members successively from the base of the casings into said rotor chambers for positioning said members to separate in the rotor chambers combustible charges from combusted charges and for scavenging out the combusted charges, one wall of the rotor chambers being inclined in a direction for moving said elements completely into the housings to close said combustion chambers and for moving said members completely into the extensions at one end of the casings to close said supply ports, said edge having spaced portions acting to temporarily maintain said elements and members completely within the housings and casings and for compressing combustible charges in the compression chambers, spark plugs carried by the housings at said ends of the latter, the said spaced portions of said edge being formed with grooves, and a resiliently supported sealing member of segmental contour mounted in and extended from each groove.

4. In a rotary motor of that type including a rotor having spaced chambers opening at its outer edge, spaced stationary housings, spaced stationary casings alternately disposed with respect to the housings, said housings and casings surrounding said edge and opening at their bases into said chambers, a tubular element completely in and pivotally supported at one end within each housing providing a combustion chamber having an open end intermittently closed by one end of the housing and formed with a normally closed valve controlled intake within the housing for the other end of the combustion chamber, an abutment at the base of each housing for the pivoted end of said element and coacting with the latter and housing to provide a compression chamber opening into said intake, means normally tending to project said elements through the base of the housings successively into said rotor chambers to provide for the pressure of combusted charges acting to drive the rotor and for positioning said elements to force incoming charges into the compression chambers and separating combusted charges from incoming charges, said casings being formed with end extensions provided with combustible charge supply and exhaust ports for communication with the rotor chambers, a controlling member pivoted at one end within each casing between the ports in the latter, means tending to normally project said members successively from the base of the casings into said rotor chambers for positioning said members to separate in the rotor chambers combustible charges from combusted charges and for scavenging out the combusted charges, one wall of the rotor chambers being inclined in a direction for moving said elements completely into the housings to close said combustion chambers and for moving said members completely into the extensions at one end of the casings to close said supply ports, said edge having spaced portions acting to temporarily maintain said elements and members completely within the housings and casings and for compressing combustible charges in the compression chambers, spark plugs carried by the housings at said ends of the latter, said members being formed with oppositely disposed spring pressed sealing devices extended from the sides thereof, and sealing means between said elements and housing and said elements and opposed walls of the rotor chambers.

5. In a rotary motor of that type including a rotor, stationary pressure generating devices of the external combustion type circumferentially surrounding and for applying the pressure of combusted charges to the rotor for driving the latter, each of said devices including a housing open at its base, a shiftable tubular element for extension through the base of the housing into the outer edge of the rotor and intermittently shifted outwardly therefrom by the rotor, said element being pivoted at one end within the housing disposed lengthwise of and of less length than the latter and providing a combustion chamber having a normally open end completely closed intermittently by one end of the housing when said element is shifted outwardly from and by the rotor, said element carrying means at its pivoted end providing a normally closed valve controlled intake within the housing for said chamber, an abutment at the base of the housing for the pivoted end of said element and forming in connection with the latter and the housing a compression chamber opening into said intake, means normally tending to shift said element through the base of the housing into the rotor to open the combustion chamber to provide for the pressure of a combusted charge acting on the rotor and for positioning said element in the rotor to force a combustible charge into a compression chamber and for separating a combustible charge from a combusted charge, and a spark plug carried by said end of the housing, the pivots for said elements and the said elements provided with communicating means for circulating a cooling medium around the combustion chamber.

6. In a rotary motor of that type including a rotor having spaced chambers opening at its outer edge, spaced stationary housings, spaced stationary casings alternately disposed with respect to the housings, said housings and casings surrounding said edge and opening at their bases into said chambers, a tubular element completely in and pivotally supported at one end within each housing providing a combustion chamber having an open end intermittently closed by one end of the housing and formed with a normally closed valve controlled intake within the housing for the other end of the combustion chamber, an abutment at the base of each housing for the pivoted end of said element and coacting with the latter and housing to provide a compression chamber opening into said intake, means normally tending to project said elements through the base of the housings successively into said rotor chambers to provide for the pressure of combusted charges acting to drive the rotor and for positioning said elements to force incoming charges into the compression chambers and separating combusted charges from incoming charges, said casings being formed with end extensions provided with combustible charge supply and exhaust ports for communication with the rotor chambers, a controlling member carried by the casing and arranged between the ports in the latter, means tending to normally project said members successively through the base of the casings into the rotor chambers for positioning said members to separate in the rotor chambers combustible charges from combusted charges and for scavenging out the combusted charges, one wall of the rotor chambers being inclined in a direction to completely shift said elements into the housings for closing said combustion chambers and for moving said members into the casings, said edge having spaced parts acting to temporarily maintain said elements and members completely within the housings and the extensions at one end of the casings and for compressing combustible charges in the compression chambers, and spark plugs carried by the housings at said ends of the latter.

7. In a rotary motor, a rotor having the outer edge of its rim formed with spaced circumferentially extending chambers opening at said edge, said edge being formed with grooves between said chambers, spaced stationary pressure generating devices of the external combustion type disposed circumferentially of said edge, opening at the bases thereof into said chambers and each formed with a stationary compression and a shiftable combustion rim chamber for communication with the rotor chambers, combined intake and exhaust mechanisms disposed circumferentially with respect to and for communication with said rotor chambers and alternately disposed with respect to said devices, each of said devices including a spring controlled element normally tending to project successively into said rim chambers for separating an incoming charge from a combusted charge and for forcing a combustible charge into a compression chamber, the said combustion chambers being in said elements and normally open to the rim chambers, the said compression chambers being located adjacent and normally closed to said combustion chambers and normally open to said rim chambers, said elements including normally closed spring controlled intakes for said combustion chambers leading from the compression chambers, each of said mechanisms including a spring controlled controlling member normally tending to project successively into the rotor chambers for separating an incoming charge from a combusted charge and for scavenging out the combusted charge, said rotor including means common to said elements and members for shifting them from said rotor chambers completely clear of said rim chambers and for closing the combustion chambers, and resiliently supported sealing members of arcuate curvature mounted in and extended from said grooves and providing in connection with said devices and mechanisms for sealing the rim chambers relatively to each other, for temporarily maintaining said elements and controlling members clear of the rim chambers without breaking the seal between the latter and for temporarily closing the intakes of said mechanisms and the compression chambers of said devices.

8. In a rotary motor, a rotor having the outer edge of its rim formed with spaced circumferentially extending chambers opening at said edge, said edge being formed with grooves between said chambers, spaced stationary pressure generating devices of the external combustion type disposed circumferentially of said edge, opening at the bases thereof into said rim chambers and each formed with a stationary compression and a shiftable combustion chamber for communication with the rotor chambers, combined intake and exhaust mechanisms disposed circumferentially with respect to and for communication with said rotor chambers and alternately disposed with respect to said devices, each of said devices including a spring controlled element normally tending to project successively into said rim chambers for separating an incoming charge from a combusted charge and for forcing a combustible charge into a compression chamber, the said combustion chambers being in said elements and normally open to the rim chambers, the said compression chambers being located adjacent and normally closed to said combustion chambers and normally open to said rim chambers, said elements including normally closed spring controlled intakes for said combustion chambers leading from the compression chambers, each of said mechanisms including a spring controlled controlling member normally tending to project successively into the rotor chambers for separating an incoming charge from a combusted charge and for scavenging out the combusted charge, said rotor including means common to said elements and members for shifting them from said rotor chambers completely clear of said rim chambers and for closing the combustion chambers, and resiliently supported sealing members of arcuate curvature mounted in and extended from said grooves and providing in connection with said devices and mechanisms for sealing the rim chambers relatively to each other, for temporarily maintaining said elements and controlling members clear of the rim chambers without breaking the seal between the latter and for temporarily closing the intakes of said mechanisms and the compression chambers of said devices, and oppositely disposed spring pressed sealing means slidably mounted in and extended from the sides of said controlling members.

9. In a rotary motor of that type including a rotor, stationary pressure generating devices of the external combustion type circumferentially surrounding and for applying the pressure of combusted charges to the rotor for driving the latter, each of said devices including a housing open at its base, a shiftable tubular element for extension through the base of the housing into the outer edge of the rotor and intermittently shifted outwardly therefrom by the rotor, said element being pivoted at one end within the housing disposed lengthwise thereof and of less length than the latter and providing a combustion chamber having a normally open end completely closed intermittently by one end of the housing when said element is shifted outwardly from and by the rotor, said element carrying means at its pivoted end providing a normally closed valve controlled intake within the housing for said chamber, an abutment at the base of the housing for the pivoted end of said element and forming in connection with the latter and the housing a compression chamber opening into said intake, means normally tending to shift said element through the base of the housing into the rotor to open the combustion chamber to provide for the pressure of a combusted charge acting on the rotor and for positioning said element in the rotor to force a combustible charge into a compression chamber and for separating a combustible charge from a combusted charge, and a spark plug carried by said end of the housing, said abutment being of less height than the pivoted end of said element and having one of its faces for bearing against a part of said pivoted end, said face and said part inclining throughout in like directions.

10. In a rotary motor of that type including a rotor, stationary pressure generating devices of the external combustion type circumferentially surrounding and for applying the pressure of combusted charges to the rotor for driving the latter, each of said devices including a housing open at its base, a shiftable tubular element for extension through the base of the housing into the outer edge of the rotor and intermittently shifted outwardly therefrom by the rotor, said element being pivoted at one end within the housing disposed lengthwise thereof and of less length than the latter and providing a combustion chamber having a normally open and completely closed intermittently by one end of the housing when said element is shifted outwardly from and by the rotor, said element, carrying means at its pivoted end providing a normally closed valve controlled intake within the housing for said chamber, an abutment at the base of the housing for the pivoted end of said element and forming in connection with the latter and the housing a compression chamber opening into said intake, means normally tending to shift said element through the base of the housing into the rotor to open the combustion chamber to provide for the pressure of a combusted charge acting on the rotor and for positioning said element in the rotor to force a combustible charge into a compression chamber and for separating a combustible charge from a combusted charge, a spark plug carried by said end of the housing, said abutment being of less height than the pivoted end of said element and having one of its faces for bearing against a part of said pivoted end, said face and said part inclining throughout in like direction, and the said element having the inner corner of its pivoted end rounded to prevent the retarding of the pivoting of said element in opposite directions by said face.

11. In a rotary motor of that type including a rotor, stationary pressure generating devices of the external combustion type circumferentially surrounding and for applying the pressure of combusted charges to the rotor for driving the latter, each of said devices including a housing open at its base, a shiftable tubular element for extension through the base of the housing into the outer edge of the rotor and intermittently shifted outwardly therefrom by the rotor, said element being pivoted at one end within the housing disposed lengthwise of and of less length than the latter and providing a combustion chamber having a normally open end completely closed intermittently by one end of the housing when said element is shifted outwardly from and by the rotor, said element carrying means at its pivoted end providing a normally closed valve controlled intake within the housing for said chamber, an abutment at the base of the housing for the pivoted end of said element and forming in connection with the latter and the housing a compression chamber opening into said intake, means normally tending to shift said element through the base of the housing into the rotor to open the combustion chamber to provide for the pressure of a combusted charge acting on the rotor and for positioning said element in the rotor to force a combustible charge into a compression chamber and for separating a combustible charge from a combusted charge, said element provided with means for circulating a cooling medium around the combustion chamber therein, a pivot shaft for and anchored to said element, said shaft being extended beyond each side of the housing and being formed with a pair of spaced endwise opposed oppositely extending cooling medium supply and return channels terminating at their outer ends at the ends of said shaft for communication respectively with cooling medium supply and return lines, and said channels having their inner ends communicating at spaced points with said means for circulating the cooling medium around the combustion chamber, and a spark plug carried by said end of said housing.

PHILIP H. D. WINSOR.
CHRISTOPHER NORMAN ADAMS.